(12) United States Patent
Siedal

(10) Patent No.: US 6,710,296 B2
(45) Date of Patent: Mar. 23, 2004

(54) METHOD AND APPARATUS FOR FREE-FORGING OF METAL STRUCTURES

(75) Inventor: David S. Siedal, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/989,333

(22) Filed: Nov. 20, 2001

(65) Prior Publication Data

US 2003/0094259 A1 May 22, 2003

(51) Int. Cl.$^7$ ............................................... B23K 26/34
(52) U.S. Cl. .............................. 219/121.85; 219/121.64
(58) Field of Search ........................... 164/98, 48, 492, 164/494, 496, 250.1, 506, 512; 219/121.85, 121.83, 121.64, 121.14, 121.15

(56) References Cited

U.S. PATENT DOCUMENTS

| | | | |
|---|---|---|---|
| 2,299,747 A | * 10/1942 | Harter | 219/76.12 |
| 2,719,900 A | * 10/1955 | Persson | 219/74 |
| 3,417,223 A | * 12/1968 | Steigerwald | 219/121.35 |
| 4,886,108 A | * 12/1989 | Utsunomiya et al. | 164/461 |
| 5,207,371 A | * 5/1993 | Prinz et al. | 228/125 |
| 5,837,960 A | * 11/1998 | Lewis et al. | 219/121.63 |
| 6,215,093 B1 | * 4/2001 | Meiners et al. | 219/121.61 |

FOREIGN PATENT DOCUMENTS

| | | | | |
|---|---|---|---|---|
| DE | 3905684 A1 | | 8/1990 | |
| JP | 56-151171 | * | 11/1981 | ............ B23K/9/04 |
| JP | 63 274779 | | 11/1988 | |
| JP | 63-274779 | * | 11/1988 | ............ C23C/26/00 |
| JP | 11 245063 | | 9/1999 | |
| JP | 11-245063 | * | 9/1999 | ............ B23K/26/00 |

\* cited by examiner

*Primary Examiner*—W. Alexandra Elve
*Assistant Examiner*—Kevin P. Kerns
(74) *Attorney, Agent, or Firm*—Bracewell & Patterson, L.L.P.

(57) ABSTRACT

A method and apparatus are provided for rapid production of high-strength metal structures. A computerized model of the structure is created, then the model is sliced into horizontal layers. A computer-controlled gantry controls the location of a roller in at least three axes (x, y, and z), the roller depending from the gantry. An electron or laser beam melts the end of a metal wire, forming a puddle of molten metal near the roller. Coordinates defining each layer of the model of the component are sent to the gantry, which moves the roller over the puddle to create a uniform-thickness layer, the wire feeding additional metal to be melted by the beam as the gantry moves. The puddle is narrow, typically requiring multiple narrow strips to be laid adjacent each other to form a complete layer. When a layer is completed, additional layers are formed on the first layer, and this process repeats until the structure is completed.

18 Claims, 2 Drawing Sheets

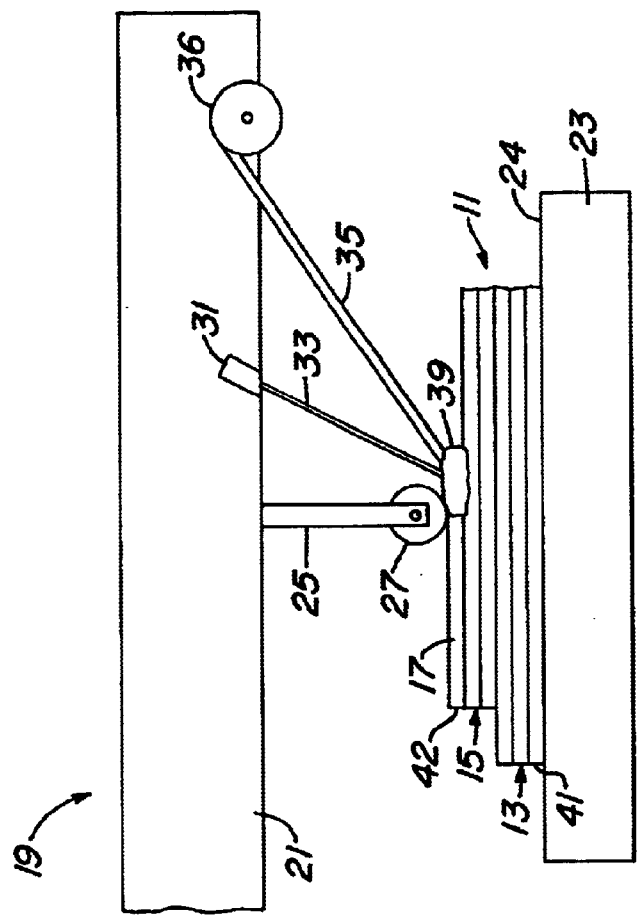
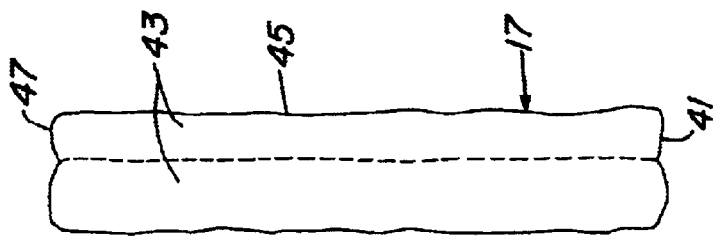

METHOD AND APPARATUS FOR FREE-FORGING OF METAL STRUCTURES

BACKGROUND OF THE INVENTION

1. Field of the Invention

This invention relates generally to the forming of metal structures and relates specifically to the forming of metal structures from the controlled application of layers of molten metal

2. Description of the Prior Art

Metal structures formed by a typical forging process have very high strength. The strength is mainly due to the large numbers of dislocations caused by plastic deformation within the structure during the forging. Forging is normally done by placing metal ingots in hardened dies and using large presses or hammers to apply force to the dies. The dies are usually very expensive and require significant fabrication time. Forged components are used in critical locations, such as aircraft bulkheads, engine crankshafts, or other similar high-load applications.

Due to its low weight and high strength, titanium is used in many aircraft applications. However, the lead time required to obtain titanium ingots may be a year or more. In addition, the forging and machining time may also be a year more, presenting problems when a part is needed quickly for testing or fitting.

In many modern industries, rapid-prototyping is used to create components from materials other than those that will be used to form the final product, for example, a gear formed from plastic rather than from metal. The advantage to rapid prototyping is that a dimensionally-accurate part can be created quickly and inexpensively produced to check for fit within an assembly or other characteristics of the part. Typical rapid-prototype fabrication devices use lasers and computerized solid models to create parts by forming a stack of layers of a material, the layers building upon one another to form the finished part.

Two examples of materials used are photo-reactive liquid polymers and powdered metal. The polymers harden when the laser is directed onto the surface of the liquid. This creates a layer that is a three-dimensional layer of minimal height created from the two-dimensional coordinates provided from the corresponding slice of the solid model. The hardened layer is then lowered below the surface to allow liquid to flow over the hardened areas, and the laser is directed over the surface again to form the next layer, repeating until the last, uppermost layer is formed. A similar process is used with powdered metal, the laser sintering the metal into a solid in layers and building a part by stacking one layer upon the previous layer.

While the rapid prototype process provides dimensionally accurate parts, the parts normally cannot be used as final components, since they lack the desired strength. Thus, there is a need for a method and apparatus for rapidly forming high-strength parts that may be used for testing and fitting or as final components.

SUMMARY OF THE INVENTION

A method and apparatus are provided for rapid production of high-strength metal structures. A computerized model of the structure is created, then the model is sliced into horizontal layers. A computer-controlled gantry controls the location of a roller in at least three axes (x, y, and z), the roller depending from the gantry. An electron or laser beam melts the end of a metal wire, forming a puddle of molten metal near the roller. Coordinates defining each layer of the model of the component are sent to the gantry, which moves the roller over the puddle to create a uniform-thickness layer, the wire feeding additional metal to be melted by the beam as the gantry moves. The puddle is narrow, typically requiring multiple narrow strips to be laid adjacent each other to form a complete layer. When a layer is completed, additional layers are formed on the first layer, and this process repeats until the structure is completed.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 3 is a plan view of two narrow strips of metal applied by the apparatus of FIG. 2 during the application of the first layer of FIG. 2.

FIG. 4 is a schematic, profile view of the apparatus of FIG. 2 being used to form the component of FIG. 1, a subsequently-produced layer of the component being applied.

DETAILED DESCRIPTION OF THE INVENTION

Figure 1:
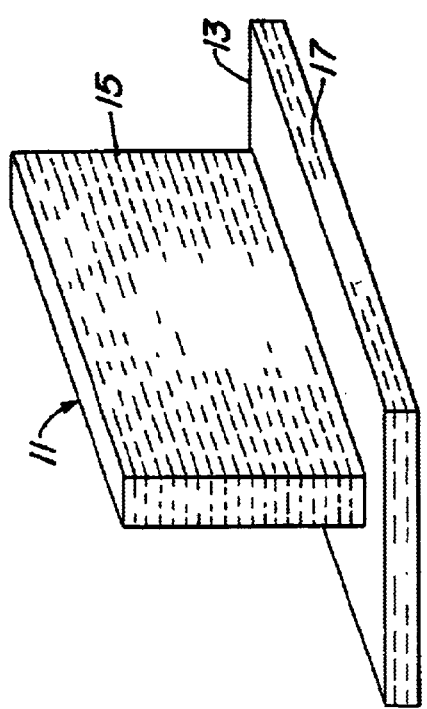
FIG. 1 is a perspective view of a metal component formed by the process of this invention.

FIG. 1 shows a member 11 formed from titanium or aluminum, though member 11 may be formed from other metals or alloys. Member 11 is designed for a particular application that requires member 11 to have the strength of forged metal. By utilizing the method of the present invention, member 11 may be formed by free-forging, resulting in the strength of a forged component without the need for the expensive tooling required in conventional forging methods.

Member 11 is shown as a T-shaped member having a flange 13 and a web 15 and may be a portion of a bulkhead for an aircraft. Web 15 has a shorter length than flange 13. Though member 11 is shown as having a T-shape, the method of the present invention can be used to produce almost any desired shape, including hollow shapes that are open or enclosed.

To form items using the free-forging process, a computer model is developed that represents the desired item. The item is typically modeled in one of the many solid-modeling programs used by engineers, such as those sold under the trademarks of CATIA and ProENGINEER. The model is then divided into horizontal slices or layers 17, each layer being a selected thickness and containing information about the x and y coordinates of the item for that layer. Layers of member 11 are shown in FIG. 1 by the dotted lines running the length of member 11 at equidistant height intervals. Layers 17 are typically each of the same thickness, though the thickness of different layers within member 11 may be varied. The number of layers in member 11 that is required to form a particular height is dependent on the thickness of each layer 17.

Figure 2:
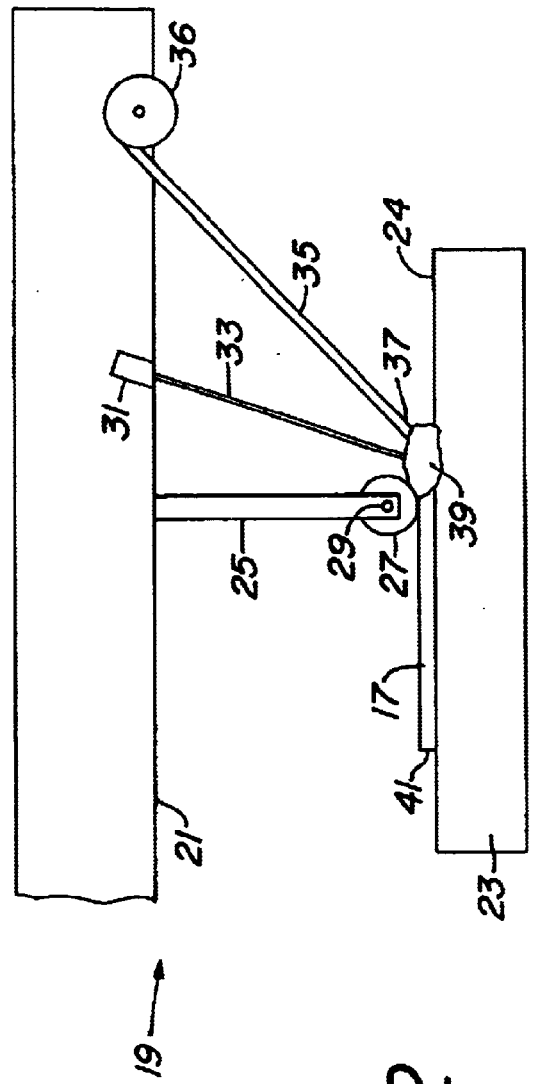
FIG. 2 is a schematic, profile view of an apparatus constructed in accordance with the present invention and being used to form the component of FIG. 1, a first layer of the component being applied.

FIG. 2 is a schematic view of the orientation of components of the free-forging fabricator 19 of the present invention. A numerical control machine or gantry 21 is located above a support plate 23. Support plate 23 is a titanium "starting" plate having a horizontal upper surface 24 onto which the first layer 17 of member 11 (FIG. 1) will be applied, the first layer becoming joined with support plate 23. Support plate 23 may be a sacrificial element in the free-forging process or may form an integral part of the completed member. Post 25 depends from the lower portion of gantry 21 toward upper surface 24, post 25 being movable by gantry 21 in at least three axes (x, y, and z, or length, width, and height). Roller 27 is rotatably attached to the lower portion of post 25 and rotates on shaft 29. Roller 27 maybe formed from ceramics or other high-temperature alloys and is water-cooled. Post 25 can apply pressure through roller 27 during operation.

A device 31 for producing an electron or laser beam 33 is also located in the lower portion of gantry 21. Electron beams are used within a vacuum chamber, whereas laser beams are used in an inert atmosphere. Device 31 is capable of directing beam 33 toward a location forward of and near roller 27. Metal wire 35 is located forward of roller 27, wire 35 being formed of the metal or alloy that is the raw material for layer 17. One type of metal for wire 35 is aluminum, and another type is titanium. Wire 35 is typically metal wire with a thickness in the range of 0.035 inches to 0.156 inches. Alternatively, a tube for delivering powdered metal may be used in place of wire 35, the powdered metal being used for the raw material in forming member 11. A feeding mechanism 36 is mounted to gantry 21 for movement with gantry 21 and continuously feeds wire 35 toward support plate 23.

Beam 33 is used to melt the lower end 37 of metal wire 35 and a shallow portion of upper surface 24 of support plate 23, the melted metal forming puddle 39 ahead of roller 27 when fabricator 19 is in operation. As end 37 is melted and applied, additional metal is provided by continuously feeding wire 35 toward beam 33 or by delivering additional powdered metal through a tube. Puddle 39 is molten where beam 33 is directly on puddle 39, but the trailing edge of puddle 39 becomes plasticized, or an amorphous solid, where puddle 39 has cooled to below the melt temperature. Gantry 21 positions post 25 and roller 27 relative to support plate 23 to produce layers 17 in the desired location in the horizontal plane and with the desired thickness by rolling over the plasticized portion of puddle 39 in a continuous-motion process beginning at end 41 and moving to the right in the figure. Roller 27 displaces a volume of the metal as it rolls over the metal and creates the desired thickness in each 17. Post 25, beam 33, and wire 35 preferably maintain their relative positioning during operation.

Because of the narrow width of wire 35, puddle 39 is also narrow. As shown in FIG. 3, in order to form a wide layer 17, a layer is typically formed by a plurality of narrow strips 43, each strip 43 being created during a pass of roller 27 from the starting end 41 to the end of the length of each layer 17. Each strip 43 overlaps the adjacent, previous strip 43 by approximately 40%, beam 33 remelting a portion of the adjacent strip 43 and creating a seamless blend between strips 43.

FIG. 4 shows the formation of member 11 using a stack of layers 17. After the formation of each completed layer 17, a second layer 17 is formed on top of the first layer 17. As puddle 39 is formed during application of strips 43 in each layer 17, a portion of the metal in the layer 17 immediately below the layer 17 being applied is melted, again forming a seamless transition from one layer 17 to the next and creating a continuous structure within member 11. The process is repeated to add additional layers until the height of member 11 is reached. As shown, web 15 has a shorter length than flange 13, and this is formed by beginning layers 17 in web 15 at starting end 42, which is forward of starting end 41 of layers 17 in flange 13. Alternatively, member 11 maybe formed such that layers 17 of web 15 begin at the same position as those of flange 13 but end rearward of the end position of the layers of flange 13.

FIG. 3 also illustrates the lack of dimensional control on side edges 45 and end edges 47. Because roller 27 (FIG. 2) has a flat circumferential surface, roller 27 controls the height of layer 17 but cannot control the shape of edges 45, 47 as excess metal in puddle 39 (FIG. 2) is displaced from beneath roller 27 as roller 27 rolls over puddle 39. Where necessary, machining or other processes may be used to remove excess material or smooth surfaces of a completed member.

Referring to FIGS. 2 through 4, in operation, the digital information needed to form a first layer 17 is sent from a computer (not shown) to gantry 21. Support plate 23 is positioned below gantry 21, and, depending on the type of beam 33 used, an inert atmosphere or vacuum is created around fabricator 19. Gantry 21 moves post 25 and roller 27 to a starting point which is on the first end 41 of layer 17. Roller 27 is positioned so that the lowest point of roller 27 is at a height above upper surface 24 that is equal to the desired height of layer 17. Metal wire 35 is moved into position near roller 27, and device 31 is activated to cause beam 33 to melt end 37 of wire 35. Puddle 39 forms at the intersection of beam 33 and wire 35. Gantry 21 begins moving roller 27 along the path defined by the solid model of member 11, a first narrow strip 43 along the length of layer 17 being formed. While beam 33 is active, wire 35 is continuously fed toward beam to provide additional metal for melting and application.

At the end of the first strip 43, device 31 is switched off to halt melting of wire 35 by beam 33, and roller 27 rolls over the last of puddle 39. Gantry 21 then moves post 25 to a starting position at starting end 41, positioning roller 27 such that roller is moved over relative to the first strip 43 by an amount equal to approximately 60% of the width strip 43. Device 31 is switched on to provide beam 33, and wire 35 is fed toward beam 33 as gantry moves roller 27 forward to create the adjacent strip 43. Additional strips 43 are applied to create the width of the current layer 17.

As one layer 17 is completed, gantry moves post 25 upward (in the z direction) to a height above the first layer 17 equal to the height of the second layer 17. Adjacent strips 43 are formed in the same manner as described above, creating second layer 17. Additional layers are applied to create a stack of layers, creating the height of member 11. If support plate 23 is a sacrificial element, member 11 is removed from support plate 23, the removal requiring machining of member 11 from support plate 23.

There are many advantages to using the present invention. The method and apparatus disclosed provides for rapid prototyping of high-strength items. Items can then be used for testing of in assemblies. Items made from titanium or other metals or alloys requiring long lead times for acquisition or machining can be quickly created using inexpensive and readily-available wire stock or wire stock.

While the invention has been shown in only one of its forms, it should be apparent to those skilled in the art that it is not so limited but is susceptible to various changes without departing from the scope of the invention.

I claim:

1. A method for forming metal items, the method comprising:
   (a) suspending a rotatable roller over a support surface;
   (b) positioning a supply of metal adjacent the support surface; and
   (c) creating a first layer of the item by melting a portion of the metal with a directional heat source onto the support surface while simultaneously rolling the roller over a plasticized portion of the molten metal in a continuous process, a distance between the roller and the support surface defining a thickness of the first layer of the item, then
   (d) creating a second layer of the item by melting a portion of the metal with the directional heat source onto the first layer while simultaneously rolling the roller over a plasticized portion of the molten metal of the second layer in a continuous process, a distance between the roller and the first layer defining a thickness of the second layer of the item.

2. The method of claim 1, further comprising:
   (e) repeating step (d) for third and subsequent layers to create a vertical stack of layers, each layer being applied adjacent a previous layer.

3. The method of claim 1, wherein:
   step (c) comprises creating the first layer with a constant thickness.

4. The method of claim 1, wherein:
   step (c) comprises using an electron beam as the heat source.

5. The method of claim 1, wherein:
   step (c) comprises using a laser as the heat source.

6. The method of claim 1, wherein:
   step (b) comprises using aluminum as the metal.

7. The method of claim 1, wherein:
   step (b) comprises using titanium as the metal.

8. The method of claim 1, further comprising:
   suspending the roller from a gantry, and positioning and moving the roller with the gantry in relation to the support surface.

9. The method of claim 1, wherein:
   step (b) comprises using a wire as the supply of metal.

10. The method of claim 1, wherein:
    step (b) comprises using powdered metal as the supply of metal.

11. The method of claim 8, further comprising: controlling the gantry with a computer; and
    moving the gantry in correlation to a computer representation of the item.

12. The method of claim 8, further comprising:
    making a computer representation of the item with a computer, then controlling the gantry with a computer; and
    moving the gantry in correlation to the computer representation of the item, each layer being formed to be a physical representation of a horizontal slice of selected thickness within the computer representation of the item.

13. A method for forming metal items, the method comprising:
    (a) suspending a roller above a support surface;
    (b) feeding a wire of metal onto the support surface forward of the roller;
    (c) melting an end of the wire to create a molten puddle; and
    (d) moving the wire and roller simultaneously along the support surface to create a first layer, with the roller rolling on the puddle as the puddle cools; then
    (e) after the first layer has become solid, repeating steps (a) through (c) on top of the first layer to create a second layer on top of the first layer.

14. The method of claim 13, further comprising:
    repeating step (d) to create a vertical stack of layers on top of the first and second layers, each layer being applied adjacent a previous layer.

15. The method of claim 13, wherein:
    step (c) comprises using an electron beam to melt the wire in a vacuum.

16. The method of claim 13, wherein:
    step (c) comprises using a laser to melt the wire in an inert atmosphere.

17. The method of claim 13, wherein further comprising:
    controlling the movement of the wire and roller in correlation to a computer representation of the item, and forming each layer to be a physical representation of a horizontal slice of selected thickness within the computer representation of the item.

18. A method for forming metal items, the method comprising:
    (a) preparing a computer representation of a three-dimensional item to be manufactured in horizontal slices;
    (b) mounting a gantry with a roller, a directed heat source, and a supply of metal over a support surface;
    (c) based on the computer representation, causing the computer to direct the gantry and support surface to move relative to each other and directing the heat source to apply directed heat to the metal to melt the metal while simultaneously rolling the roller over a plasticized portion of the molten metal in a continuous process, thereby creating a first strip of a first layer of the item; then
    (d) based on the computer representation, causing the computer to direct the gantry and support surface to move laterally relative to each other, and repeating step (c) to create a second strip of the first layer of the item, the second strip overlapping the first strip;
    (e) repeating step (d) until a desired dimension for the first layer of the item is achieved; then
    (f) based on the computer representation, moving the gantry an increment farther from the support surface and repeating steps (c) and (d) for second and subsequent layers of the item on top of the first layer of the item.

* * * * *